United States Patent [19]

Baranzelli et al.

[11] Patent Number: 4,838,561
[45] Date of Patent: Jun. 13, 1989

[54] CHUCK, PARTICULARLY FOR MACHINE TOOLS

[75] Inventors: Cesare Baranzelli, San Vittore Olona; Claudio Frulla, Busto Arsizio; Dario Gattolin, San Vittore Olona, all of Italy

[73] Assignee: TVA Holding S.p.A., Busto Arsizio VA, Italy

[21] Appl. No.: 189,447

[22] Filed: May 2, 1988

[30] Foreign Application Priority Data

May 15, 1987 [IT] Italy .............................. 20546 A/87

[51] Int. Cl.$^4$ ............................................. B23B 31/19
[52] U.S. Cl. .................. 279/1 DA; 279/1 C; 279/1 P; 279/114
[58] Field of Search ............... 279/1 C, 1 DC, 1 P, 279/1 DA, 110, 121, 114, 123

[56] References Cited

U.S. PATENT DOCUMENTS

| | | | |
|---|---|---|---|
| 1,412,170 | 4/1922 | Dixon | 279/1 P |
| 2,872,198 | 2/1959 | Motz | 279/1 P |
| 2,893,744 | 7/1959 | Anthony | 279/121 |
| 3,610,642 | 10/1971 | Fischer et al. | 279/1 C |

FOREIGN PATENT DOCUMENTS 2749626 5/1979 Fed. Rep. of Germany ...... 279/121
157408 12/1980 Japan ................................ 279/121
79506 4/1986 Japan ................................ 279/1 L Primary Examiner—Joseph H. McGlynn
Assistant Examiner—Daniel W. Howell
Attorney, Agent, or Firm—Guido Modiano; Albert Josif

[57] ABSTRACT

The chuck includes a structure supporting a table provided with first sliding seats and with second sliding seats which extend radially from the center of the table and respectively accommodate means for centering the workpiece and means for locking the workpiece; the centering means are controllably movable towards or away from the center of the table, while the locking means are controllably movable from a first position spaced from the workpiece to a second position proximate to the workpiece and are also controllably movable in a direction substantially perpendicular to the face of the table directed towards the workpiece from a release position, in which the locking means are disengaged with the workpiece, to an engagement position, in which the locking means are engaged from the workpiece. The chuck also includes control means which act on the centering means and on the locking means; means are furthermore provided for the connection of the control means to the locking means in the second position.

11 Claims, 4 Drawing Sheets

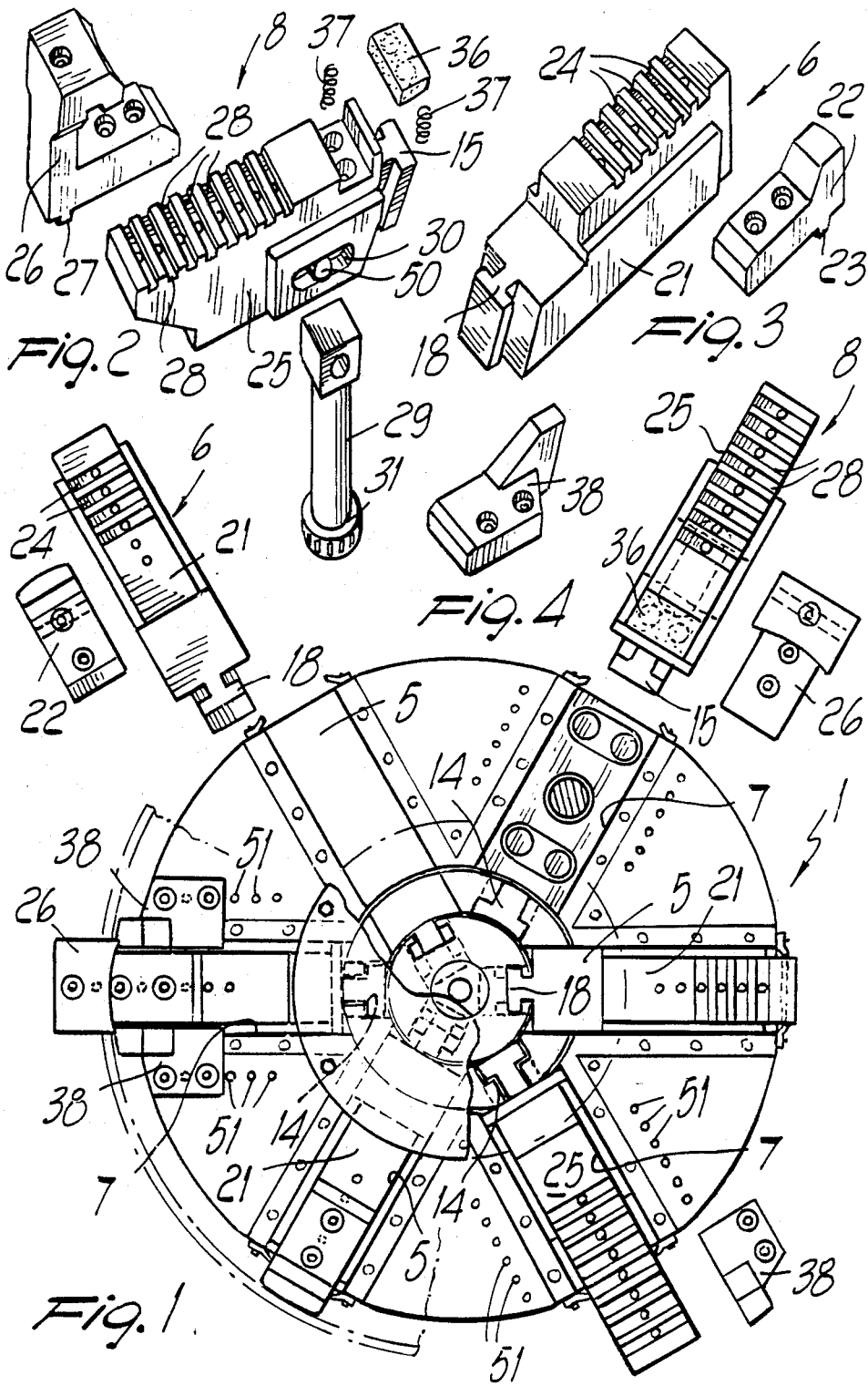

CHUCK, PARTICULARLY FOR MACHINE TOOLS

BACKGROUND OF THE INVENTION

The present invention relates to a chuck, particularly for machine tools for centering and locking a workpiece to be machined.

Chucks for machine tools are known which are constituted by a frame which supports a table on which the workpiece to be machined is positioned; on the face of the table intended to face the workpiece to be machined there are defined first sliding seats which extend radially from the center of the table and accommodate workpiece centering means, which are controllably movable towards or away from the center of the table and are intended to contact portions of the workpiece arranged above the table. Also on the face of the table directed towards the workpiece to be machined there are defined second sliding seats which, like the first sliding seats, extend radially from the center of the table and accommodate workpiece locking means controllably movable towards or away from the center of the table from a first position spaced from the portions of the workpiece to be contacted to a second position proximate to the portions of the workpiece to be contacted. The locking means, as well as in a radial direction, are also controllably movable in a direction substantially perpendicular to the face of the table directed towards the workpiece from a release position, in which the locking means are disengaged from the workpiece, to an engagement position in which the locking means are engaged with the workpiece.

Both the centering means and the locking means are constituted by sliders which are slideably accommodated respectively in said first sliding seats and in said second sliding seats and have portions protruding from the table and intended to contact portions of the workpiece to be machined so as to position it correctly on the table and couple it rigidly thereto.

Such known types of chucks, though allowing a precise centering of the part to be machined and its effective locking to the table, have some disadvantages.

In fact, to obtain the movement of the centering means and of the locking means along the table, two separate control systems are generally used which complicate its execution, unavoidably raising its production costs.

SUMMARY OF THE INVENTION

The aim of the present invention is to obviate the above described disadvantages by providing a chuck for machine tools which can be produced in a much simpler manner than known chucks, and which achieves a precise positioning and an effective locking of the workpiece.

Within this aim, an object of the invention is to provide a chuck which has high simplicity in operation, great reliability and a high degree of flexibility in use.

Another object of the invention is to provide a chuck wherein the means for controlling the centering means and the locking means are constituted by a limited number of simply producible elements.

This aim, as well as these and other objects which will become apparent hereinafter, are achieved by a chuck, particularly for machine tools, for centering and locking a workpiece to be machined, comprising a structure supporting a table provided with first sliding seats extending radially from the center of said table and accommodating workpiece centering means controllably movable towards or away from the center of the table and intended to contact portions of the workpiece arranged above said table and with second sliding seats extending radially from the center of said table and accommodating workpiece locking means controllably movable towards or away from the center of the table from a first position spaced from the portions of the workpiece to be contacted to a second position proximate to said portions of the workpiece to be contacted and controllably movable in a direction substantially perpendicular to the face of the table directed towards the workpiece from a release position, in which said locking means are disengaged from the workpiece, to an engagement position in which said locking means are engaged with the workpiece, characterized in that it comprises control means acting on said centering means for their movement towards or away from the center of the table and on said locking means for their passage from said first to said second position and vice versa, there being provided means for connecting said control means to said locking means in said second position for the passage of said locking means from said release position to said engagement position or vice versa.

BRIEF DESCRIPTION OF THE DRAWINGS

Further characteristics and advantages of the invention will become apparent from the description of a preferred but not exclusive embodiment of the chuck according to the invention, illustrated only by way of non-limitative example in the accompanying drawings, wherein:

FIG. 1 is a partially sectional and exploded top plan view of the chuck according to the invention;

FIGS. 2 to 4 are perspective views illustrating elements constituting the chuck according to the invention;

DESCRIPTION OF THE PREFERRED EMBODIMENTS

Figure 5:
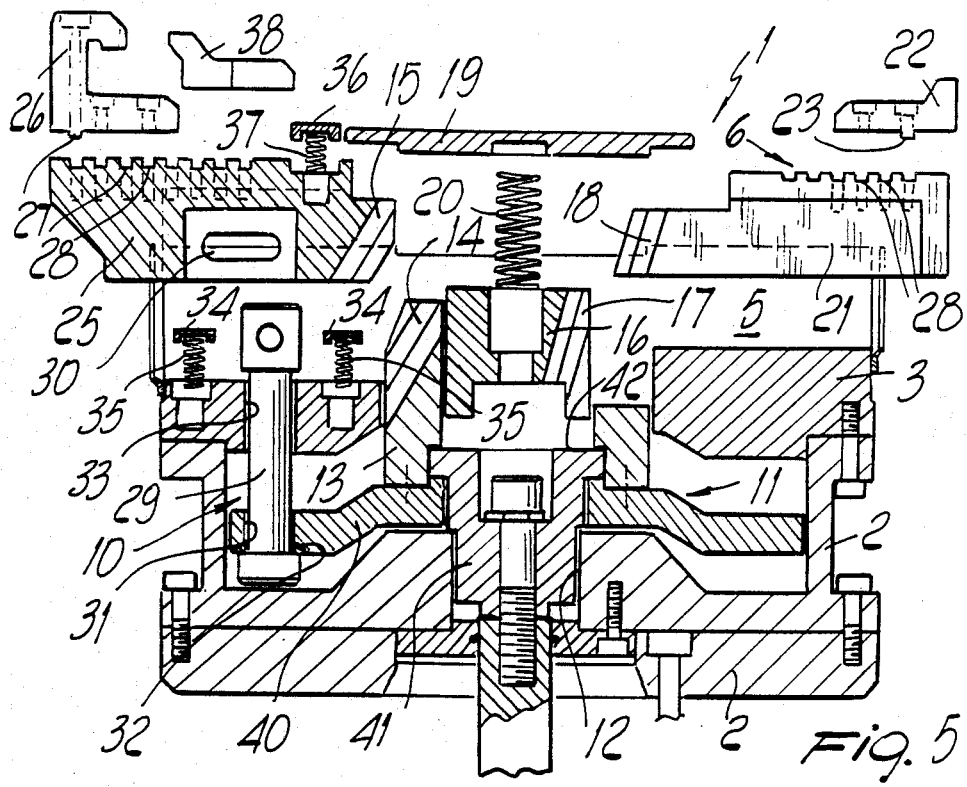
FIG. 5 is a sectional view taken along the axis of the chuck with some of its elements in exploded view.

With reference to the above described figures, the chuck according to the invention, generally indicated by the reference numeral 1, comprises a structure 2 which supports a table 3 above which the workpiece 4 to be machined is to be positioned and locked. On the face of the table which is directed towards the workpiece 4 there are defined first sliding seats 5 which extend in a radial direction from the center of the table and which accommodate centering means, generally indicated by the reference numeral 6, intended to contact portions of the workpiece 4 and controllably movable, inside the sliding seats 5, towards or away from the center of the table 3. The first sliding seats 5, which are constituted by grooves defined on the face of the table 3 directed towards the workpiece 4, are mutually angularly offset with respect to the center of the table and, between the first sliding seats 5, second sliding seats 7 are defined which also extend radially from the center of the table 3 and accommodate workpiece locking means, generally indicated by the reference numeral 8. The locking means 8 are controllably movable, inside the second sliding seats 7, towards or away from the center of the table 3 from a first position, which is spaced from the portions of the workpiece 4 to be contacted, to a second position proximate to these portions of the workpiece to be contacted. The locking means 8 are furthermore also movable in a direction substantially perpendicular to the face of the table 3 which is directed towards the workpiece 4 from a release position, in which the locking means 8 are disengaged from the workpiece 4, to an engagement position, in which the locking means 8 are engaged with the workpiece. According to the invention, control means are provided which act on the centering means 6 to obtain their movement towards or away from the center of the table and on the locking means 8 for their passage from said first to said second position and vice versa, and connection means are furthermore provided, generally indicated by the reference numeral 10, which mutually connect the control means to the locking means so that the same control means used to obtain the radial movement of the locking means and of the centering means also achieve the passage of the locking means 8 from the release position to the engagement position or vice versa.

More particularly, the control means comprise a control element 11 which has a disc-like configuration and is arranged with its axis passing through the center of the table 3 and perpendicular to the face of the table which is directed towards the workpiece 4. The control element 11 has one of its central portions slideably accommodated inside a guiding seat 12, so as to be movable in an axial direction. The control means also comprise a first return element 13 which is interposed between the control element 11 and the locking means 8 so as to convert the movement in an axial direction of the control element 11 into a movement in a radial direction, with respect to center of the table 3, of the locking means 8.

The first return element 13 may be constituted by a cylindrical sleeve which is arranged coaxially to the control element 11 and has on its lateral surface grooves 14 which are mutually angularly offset with respect to the axis of the sleeve and extend inclined towards or away from this axis. The inclination of the grooves 14 is such that during the rotation of the chuck the locking means 8 engaged with the workpiece in engagement position are stressed by a further locking safety by employing the centrifugal effect which is determined by the rotation. The grooves 14 have a T-shaped transverse cross section and slideably accommodate correspondingly configured expansions 15 which are provided on the locking means 8, so as to establish a bilateral connection in a radial direction between the first return element 13 and the locking means 8.

Between the control element 11 and the centering means 6 there is arranged a second return element 16 which is constituted by a cylinder accommodated at least partially inside and coaxially to the first return element 13. On its lateral surface, the second return element 16 has grooves 17 which are mutually angularly offset with respect to the axis of the cylinder and with respect to the grooves 15 of the first return element and which extend inclined towards or away from the axis of the cylinder; these grooves 17 have a T-shaped transverse cross section and slideably accommodate correspondingly configured expansions 18 of the centering means 6 so as to establish a bilateral connection, in a radial direction with respect to the center of the table 3, between the second return element and the centering means 6.

Advantageously, the second return element 16 is interposed between the control element 11 and a small plate 19 fixed above the face of the table 3 directed towards the workpiece 4, and between the second return element 16 and said small plate 19 there are interposed elastic means, for example a helical spring 20, which act on the second return element 16 in contrast with the action of the control element 11.

The centering means 6 are constituted by sliders 21, of a known type, which are slideably accommodated in the first sliding seats 5, and each has a portion 22 protruding from the face of the table 3 directed towards the workpiece 4. The portion 22 may be constituted by a small block which is removably associable with the slider 21, for example by means of screws, so as to be movable, if required, relatively to the slider 21 in a radial direction with respect to the center of the table to adapt itself to the dimensions of the workpiece to be locked, determining a flexibility of use on workpieces with various dimensions. For this purpose the small block which constitutes the portion 22 may be downwardly provided with a small tooth 23, provided directly on the small block, to be accommodated in seats 24 defined on the upper surface of the slider 21 and mutually spaced in a radial direction with respect to the center of the table. The small tooth 23 ensures a high degree of safety to the small block removably associable with the slider 21 during the rotation of the chuck.

In a similar manner, the locking means 8 are constituted by sliders 25 which are slideably accommodated in the second sliding seats 7 and are each provided with a portion 26 which protrudes above the table 3 to engage with the workpiece 4. Also in this case, the portions 26 may be constituted by a small block which is removably associable with the slider 25, for example by means of screws, so as to be movable in a radial direction with respect to the center of the table relatively to the slider 25 to adapt itself to the dimensions of the workpiece to be locked. For this purpose the small block which constitutes the portion 26 is downwardly provided with a small tooth 27, which is engageable in grooves 28 which are defined on the upper face of the slider 25 and are mutually spaced in a radial direction with respect to the center of the table 3 to adapt itself to the dimensions of the workpiece to be locked. The small block which constitutes the portion 26 is furthermore in the shape of a hook so as to firmly hook to portions of the workpiece 4 to be locked.

Both the sliders 21 and the sliders 25 have, at their end directed towards the center of the table, the expansions 15 and 18 which are slideably engaged in the grooves defined respectively in the first return element 13 and in the second return element 16.

To allow the coupling between the expansions 18 of the sliders 21 and the second return elemeng 16, the sleeve which constitutes the first return element 13 has recesses defined at the first sliding seats 5.

The coupling means 10 which, as mentioned, are interposed between the locking means 8 and the control element 11, are constituted by shafts 29 which have one of their ends rigidly associated with the sliders 25 during movement in a direction perpendicular to the face of the table directed towards the workpiece to be locked and the other end engageable with the control element 11 for a portion of its axial translatory motion, when the locking means 8 are in said second position.

More particularly, each shaft 29 extends in a direction perpendicular to the face of the table directed towards the workpiece to be locked and is associated with the related slider so as to allow the translatory motion of the slider in a radial direction with respect to the center of the table. Such a type of coupling may be provided, for example, by means of a pin 50 which transversely crosses the shaft 29 and engages in a slot 30 defined in the related slider 25, providing that said slot be elongated in a radial direction with respect to the center of the table. The end of the shaft 29 opposite to the related slider 25 is slideably accommodated inside a seat 31 defined in the control element 11 parallel to its axis. This end of the shaft 29 is provided with a shoulder 32 which is contacted by the control element 11 for a portion of its axial movement, after the locking means have been moved to the second position, i.e. after the locking means have been moved towards the portions of the workpiece to be locked.

The shoulder 32 may be defined by a ring screwed onto the end of the shaft 29 so as to be able to delay or anticipate the contact of the control element with the shoulder 32 according to the dimensions and the configuration of the workpiece to be loaded.

Furthermore, each shaft 29 is slideably accommodated in seats 33 which are defined in the table 3 and which extend in a direction parallel to the axis of the control element 11.

On the bottom of the second sliding seats in which the sliders 25 are accommodated, skids 34 are provided which contact, by the action of springs 35, the lower surface of the sliders 25 so as to generate a first axial movement and successively allow a radial motion. The skids 34 furthermore prevent the passage of dirt from outside in the direction of the control means of the table according to the invention. For the same purpose, the sliders 25 are upwardly provided with skids 36 which are pushed by springs 37 against the small plate 19.

On the face of the table which is directed towards the workpiece to be locked, laterally to the second sliding seats 7, there are arranged small blocks 38 which have the function of providing a support for the workpiece so as to adequately contrast the action of the locking means to avoid deformations or breakages of the workpiece. The small blocks 38 may be moved in a radial direction with respect to the center of the table by fixing them, for example by means of screws, in appropriate holes 51 laterally defined in the table on opposite sides proximate to the second sliding seats 7.

Due to constructive requirements, the control element 11 may be produced in two parts of which: a first part 40, with substantially disc-like configuration, is rigidly associated with the sleeve which constitutes the first return element 13, and a second part 41 is constituted by a sleeve, adapted to be trapped at a portion thereof between two axial shoulders defined by the first part 40 and by the first return element 13. The second part 41 has its end directed towards the second return element 16 provided with a shoulder 42 which is intended to contact, for a portion of the axial translatory motion of the control element 11, the second return element 16, determining the disengagement of the portions 22 from the workpiece.

To provide the translatory motion in an axial direction of the control element 11, known devices may be used, such as for example a hydraulic or pneumatic piston rigidly associated with the second part of the control element 11, or an endless screw which engages in a female thread defined axially in the second part 41 of the control element 11; in this last case, it is possible to provide that the second part 41 of the control element 11 be prevented from rotating by an adapted tab interposed between the second part 41 and the seat 12 which accommodates it.

Obviously, other known devices may also be used for the axial movement of the control element 11.

Figure 9:
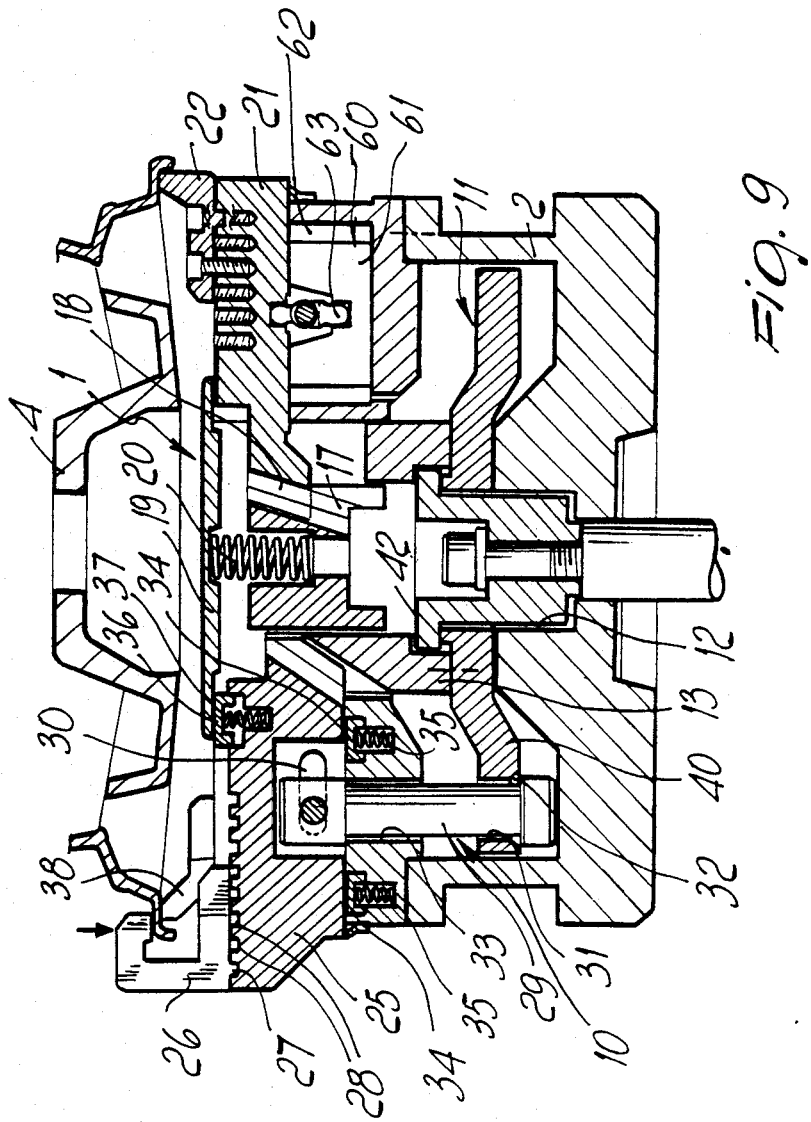
FIG. 9 is a sectional view, taken similarly to FIG. 5, of a chuck according to another aspect of the invention.

In a variated embodiment of the chuck according to the invention, as illustrated in FIG. 9, advantageously, to prevent, during operation, the portions 22 from exerting, due to the centrifugal force, an excessive pressure on the workpiece 4, compensation means are provided, indicated by the reference numeral 60, which exert on the portions 22 a force contrary to the centrifugal force. Said compensation means 60 are constituted by a small block 61 which is accommodated in a seat 62 defined in the table 3 below each slider 21. Each small block 61 can slide in the related seat 62 in a radial direction with respect to the center of the table and acts on the end of a lever 63 which is pivoted with an intermediate portion thereof to the table 3. The other end of the lever 63 acts on the overlying slider 21 so that a spacing of the small block 61 from the center of the table causes the approach to the center of the table of the slider 21. Due to this fact, during the rotation of the table, there occurs a centrifugal force which, acting on the slider 21, increases the pressure of the portions 22 on the workpiece 4, but, at the same time, there occurs a centrifugal force which acts on the small block 61. The centrifugal force which acts on the small block 61, through the lever 63, acts in the opposite direction, i.e. in a centripetal direction, on the slider 21, reducing the overall effect of the centrifugal force on the slider 21. In this manner, the pressure exerted by the portions 22 on the workpiece 4 is reduced, avoiding breakages or deformations of the workpiece 4.

Figure 6:
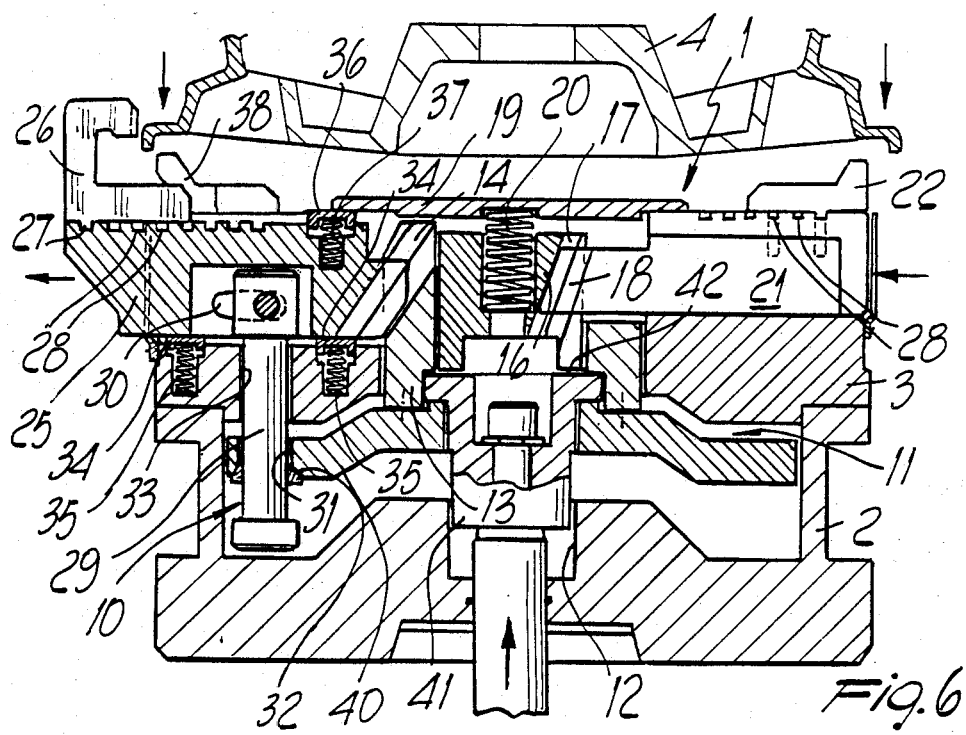
FIGS. 6 to 8 are sectional views, similar to FIG. 5, showing the steps of centering and locking of a workpiece to be machined on the table according to the invention.
Figure 7:
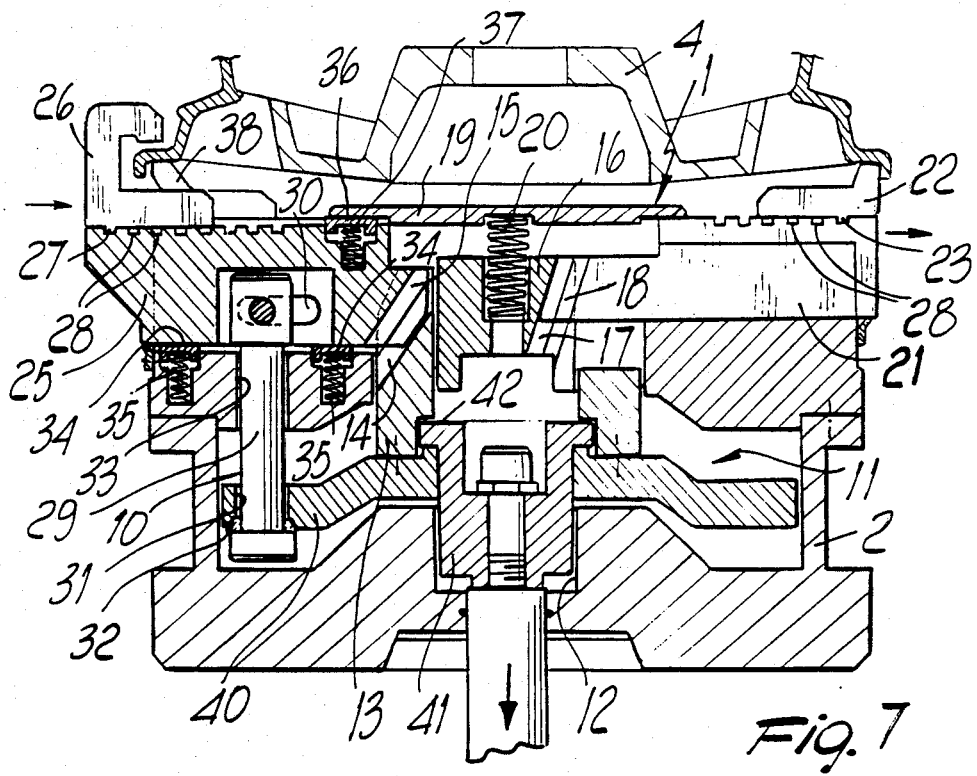
Figure 8:
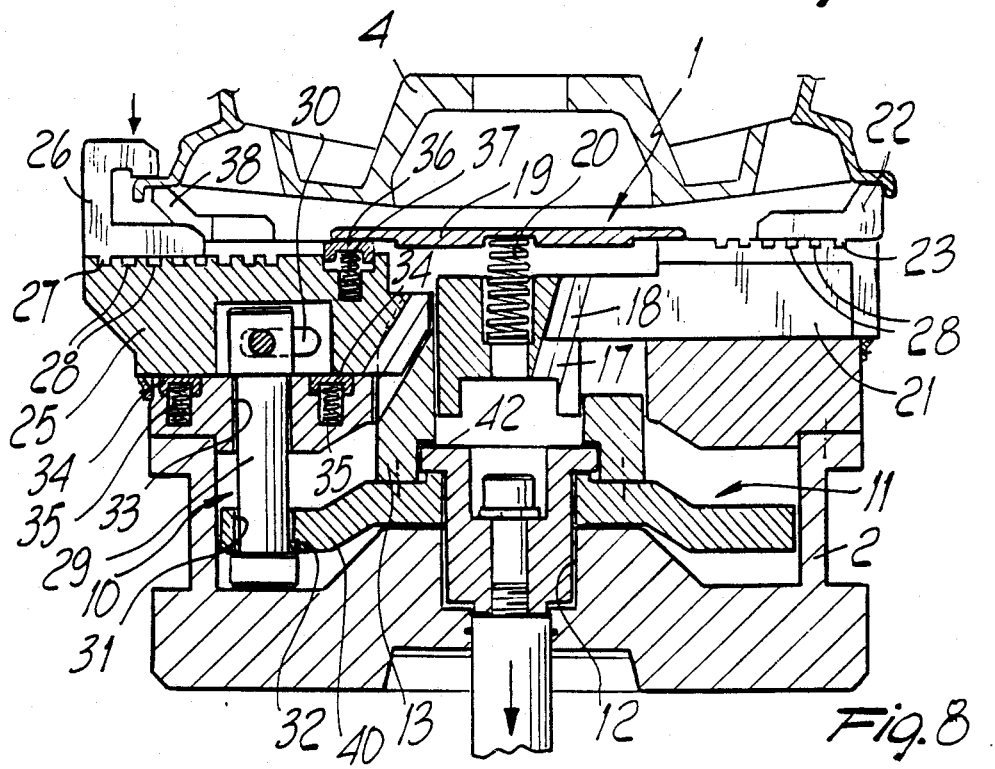

The operation of the chuck according to the invention is now described with particular reference to FIGS. 6 to 8.

The workpiece 4 to be locked is arranged above the table 3 with the control element 11 in raised position. In this position the shoulder 42 of the control element 11 is in contact with an end of the first return element 16 which keeps it in a position which corresponds, due to how the grooves 17 are executed, to the position of maximum approach to the center of the table of the portions 22 intended to contact the workpiece 4 to perform its centering. To this position of the control element 11 there corresponds, due to how the grooves 14 of the first return element are executed, the position of maximum spacing from the center of the table of the portions 26 of the locking means 8. Furthermore, the shoulder 32 of the shafts 29 is spaced from the control element 11 in a direction parallel to its axis (FIG. 6).

By moving the control element 11 parallel to its axis, i.e. by moving it away from the face of the table directed towards the workpiece 4, the axial translatory motion of the first return element 13 and, due to the action of the spring 20, the axial translatory motion of the second return element 16 are obtained. In this manner the spacing of the centering means 6 away from the center of the table is caused until the portions 22 are moved into contact with the workpiece 4 so as to perform its centering relatively to the table and, simultaneously, is obtained the passage of the locking means from the first position, in which the portions 26 were spaced from the workpiece 4, to the second position in which the portions 22 are proximate to the workpiece 4 to be locked. When the portions 22 contact the workpiece 4, the second return element 16 ceases, as an effect of said contact, its axial translatory motion, while the control element 11 continues in its axial translatory motion unitl it engages with the shoulder 32 of the shafts 29 (FIG. 7).

As an effect of the engagement of the control element 11 with the shoulder 32, the further axial translatory motion of the control element 11, i.e. its further spacing from the face of the table 3 directed towards the workpiece 4, causes the movement, in a direction perpendicular to the face of the table directed towards the workpiece 4, of the locking means, which pass from the release position, in which they were disengaged from the workpiece 4, to the engagement position, in which the portions 26 engage with the workpiece 4, locking it to the table 3. In this step, due to the presence of the shafts 29, the control element 11, the first return element 13 and the sliders 25 behave as a single part which moves in a direction parallel to the axis of the control element 11. Due to this fact, during this translatory movement, the locking means do not move in an axial direction with respect to the center of the table 3 (FIG. 8). At this point the workpiece 4 is correctly positioned and locked onto the chuck 1 and may undergo the various machinings.

For the release of the workpiece 4 one proceeds by repeating in reverse the operations now described.

In practice it has been observed that the chuck according to the invention fully achieves the intended aim since, by virtue of the fact that the centering and the locking of the workpiece may be obtained by means of a single control, i.e. by means of a simple axial translatory motion of the control element, it has great simplicity both in execution and in operation.

Another advantage of the chuck according to the invention is that of allowing to vary the radial stroke of the locking means and the extent of their movement in a direction perpendicular to the face of the table which is directed towards the workpiece to be locked so as to allow the centering and the locking of workpieces having configurations which are even very different from one another.

The chuck thus conceived is susceptible to numerous modifications and variations, all within the scope of the inventive concept; thus, for example, the grooves 14 of the first return element 13 and the grooves 17 of the second return element 16 may have an opposite inclination with respect to the inclination illustrated in the figures; furthermore, the shoulder 32 of the shafts 29 may be arranged above the control element 11, instead of below as illustrated in the figures. The shoulder 42 of the control element 11 may also be arranged above the second return element 16, instead of below as illustrated in the figures; in this case, the second part 41 of the control element 11 axially and slideably traverses the second return element 16 and the spring 20 may be arranged below the second return element 16 between the latter and a further axial shoulder defined on the second part 41 of the control element 11 or on the frame 2.

Furthermore, all the details may be replaced with technically equivalent elements.

In practice, the materials employed, as well as the dimensions, may be any according to the requirements and to the state of the art.

We claim:

1. Chuck, particularly for machine tools, for centering and locking a workpiece to be machined, comprising a structure supporting a table provided with first sliding seats extending radially from the center of said table and accommodating workpiece centering means controllably movable towards and away from the center of the table and intended to contact portions of the workpiece arranged above said table and with second sliding seats extending radially from the center of said table and accommodating workpiece locking means controllably movable towards or away from the center of the table from a first position spaced from the portions of the workpiece to be contacted to a second position proximate to said portions of the workpiece to be contacted and controllably movable in a direction substantially perpendicular to the face of the table directed towards the workpiece from a release position, in which said locking means are disengaged from the workpiece, to an engagement position in which said locking means are engaged with the workpiece, said chuck further comprising control means acting on said centering means for their movement towards or away from the center of the table and on said locking means for their passage from said first to said second position and vice versa, there being provided means for connecting said control means to said locking means in said second position for the passage of said locking means from said release position to said engagement position or vice versa.

2. Chuck, according to claim 1, wherein said control means comprise a control element slideably accommodated in said structure and movable along a direction substantially perpendicular to said table, said control element being coupled to a first return element acting on said locking means for their movement from said first to said second position and vice versa, said control element acting, furthermore, at least for a portion of its movement along said direction substantially perpendicular to said table, on a second return element coupled to said centering means for their movement towards or away from the center of the table upon the movement of said control element along said portion.

3. Chuck, according to claim 2, comprising elastic means acting on said second return element for biasing said second return element against movement of said control element for the movement of said centering means towards or away from the center of the table.

4. Chuck, according to claim 2, wherein said first return element is constituted by a sleeve arranged with its axis perpendicular to said table and passing through its center, on the lateral surface of said sleeve there being defined grooves arranged mutually angularly offset with respect to the axis of the sleeve and extending inclined towards or away from this axis, said grooves being bilaterally engaged, with expansions of said locking means constituted by sliders slideably accommodated in said second sliding seats and provided with a hook-shaped portion protruding from the table to engage with the workpiece to be locked.

5. Chuck, according to claim 4, wherein said second return element is constituted by a cylinder accommodated coaxially and slideably in said first return element, on the lateral surface of said cylinder there being defined grooves arranged mutually angularly offset with respect to the axis of said cylinder and with respect to the grooves of said first return element, said grooves of said second return element extending inclined towards or away from the axis of said cylinder and being bilaterally engaged with expansions of said centering means constituted by sliders which are slideably accommodated in said first sliding seats and are provided with a portion protruding from said table to contact the workpiece to be locked, said first return element having recesses for the passage of said sliders constituting said centering means.

6. Chuck, according to claim 2, wherein said control element has a disc-like configuration and is connected to said first return element, said control element being arranged coaxially to said second return element and being provided with a circumferential shoulder engageable, for a portion of its axial translatory motion, with said second return element.

7. Chuck, according to claim 1, wherein said connecting means comprise shafts, each having one of its ends rigidly associated in translatory motion, in a direction perpendicular to said face of said table, with one of said sliders constituting said locking means, said shaft extending perpendicular to said table and having its other end engageable with said control element for a portion of its axial translatory motion, said control element engaging said shaft when said locking means is in said second position.

8. Chuck, according to claim 7, wherein said sliders constituting said locking means are each slideably connected to at least one pin, said pin being rigidly associated with said one end of one of said shafts, said sliders being movable in a radial direction with respect to the center of the table.

9. Chuck, according to claim 7, wherein said shafts have, proximate to said other end, a shoulder adjustable along the length of said shafts and engageable with said control element.

10. Chuck, according to claim 1, comprising compensating means acting by centrifugal action on said sliders of said centering means with a centripetal-component force.

11. Chuck, according to claim 10, wherein said compensating means are constituted by a small block slideably accommodated in a seat defined in said table below each of said sliders of said centering means, said small block being slideable radially to said table and acting on the end of a lever pivoted with one of its intermediate portions to said table, said lever acting with its other end on the overlying slider.

* * * * *